Oct. 17, 1967   B. W. DELLINGER   3,346,968
ELECTRICAL ALPHABETICAL AND NUMERICAL EDUCATIONAL MACHINES
Filed Feb. 1, 1965   4 Sheets-Sheet 1
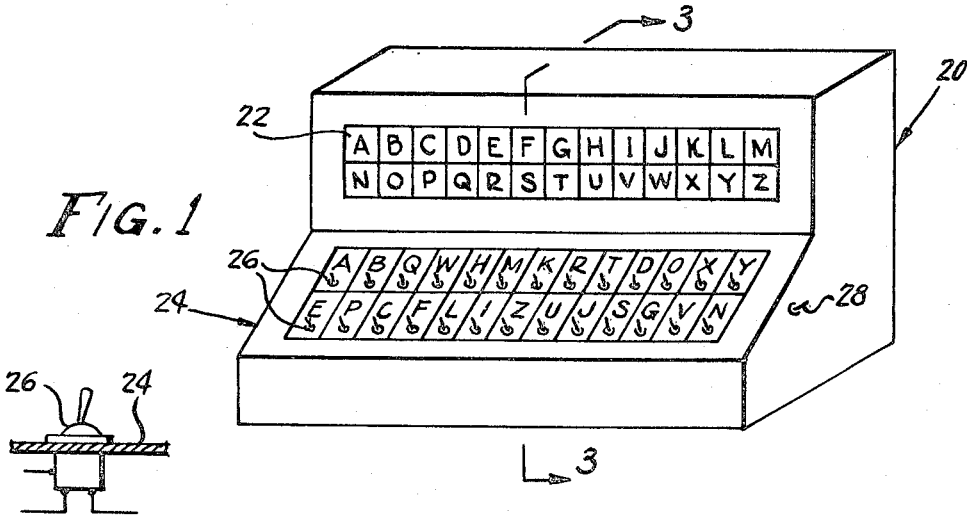
FIG.1
FIG.2
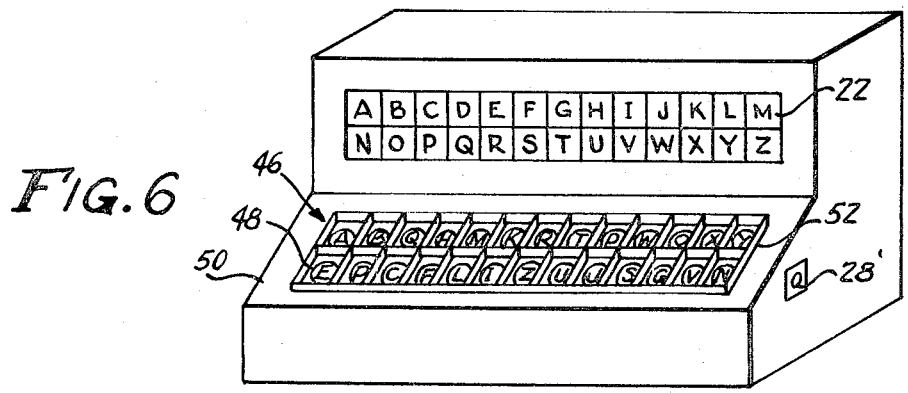
FIG.6
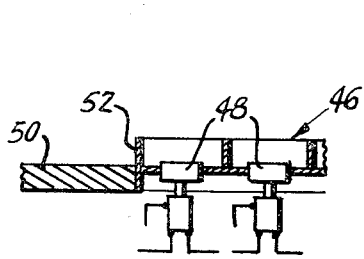
FIG.7
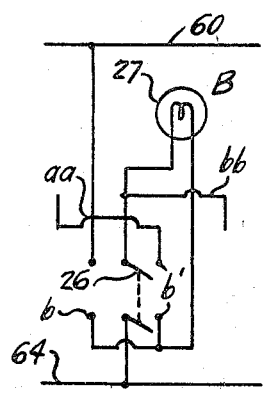
FIG.5
INVENTOR.
BASIL W. DELLINGER Oct. 17, 1967 B. W. DELLINGER 3,346,968
ELECTRICAL ALPHABETICAL AND NUMERICAL EDUCATIONAL MACHINES
Filed Feb. 1, 1965 4 Sheets-Sheet 2

INVENTOR.
BASIL W. DELLINGER

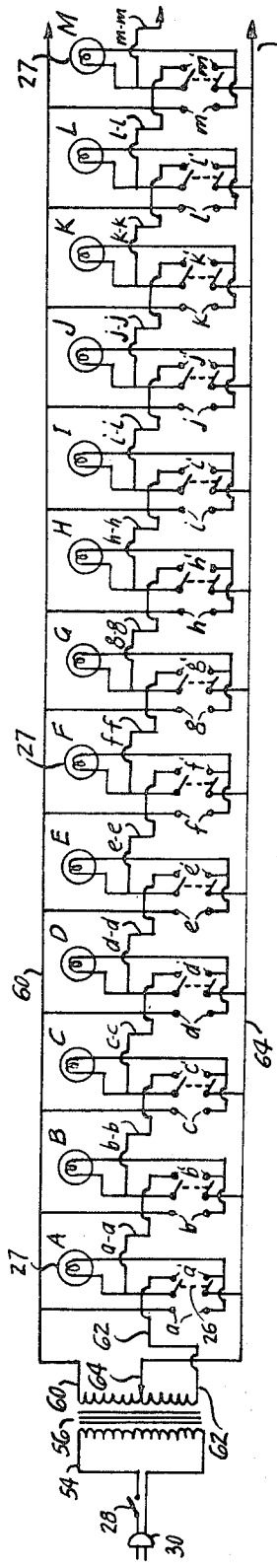
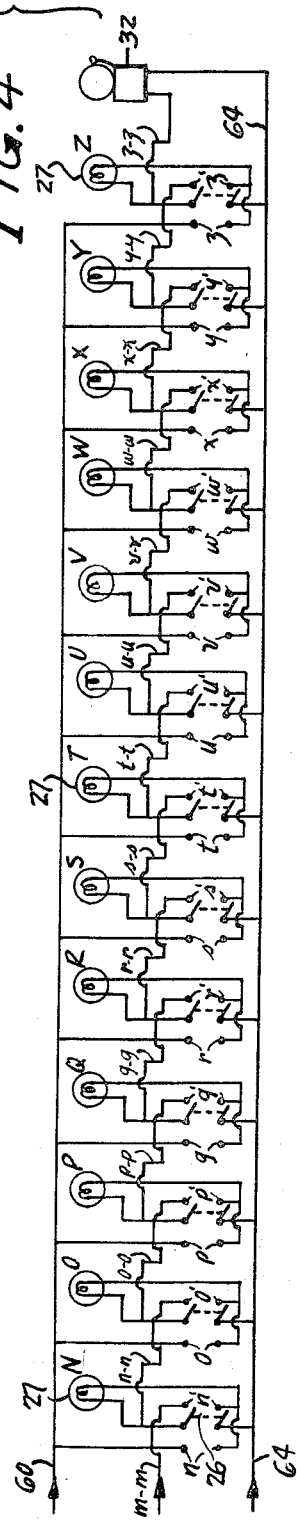
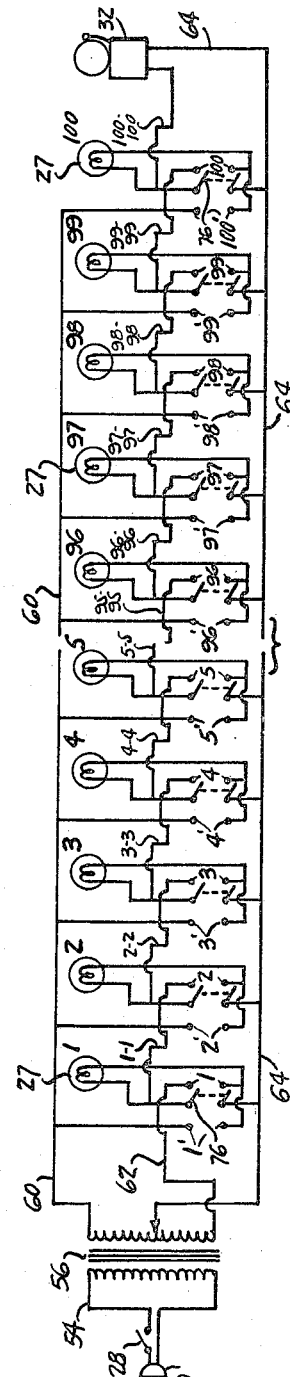
FIG. 4
FIG. 9
INVENTOR.
BASIL W. DELLINGER

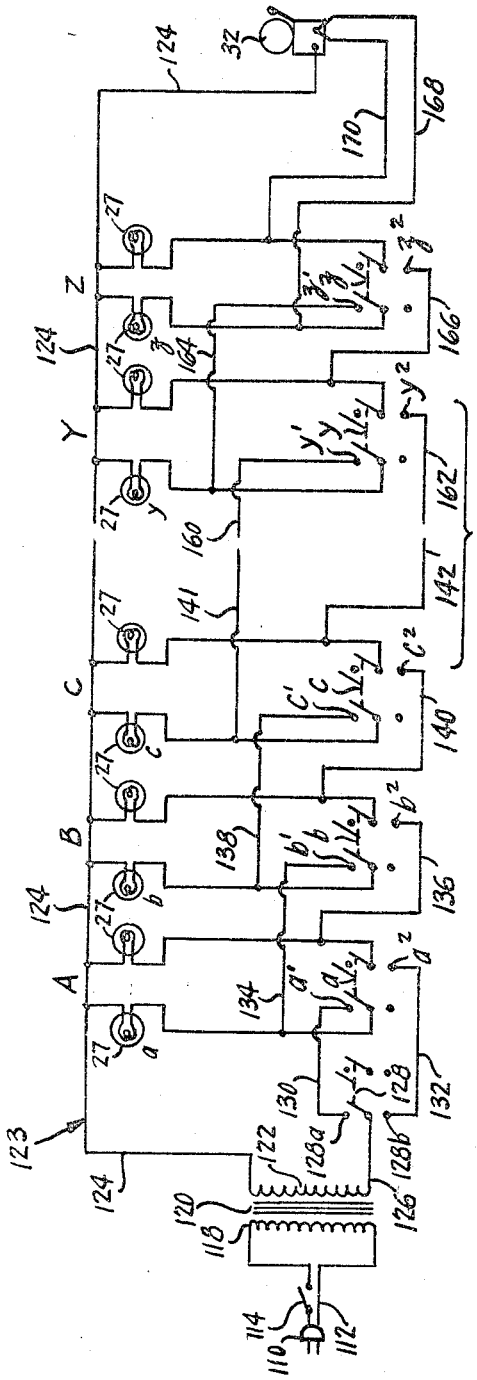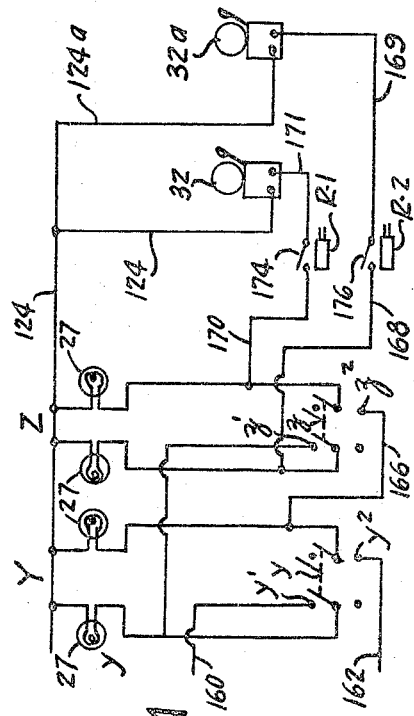

United States Patent Office 3,346,968
Patented Oct. 17, 1967

3,346,968
ELECTRICAL ALPHABETICAL AND NUMERICAL EDUCATIONAL MACHINES
Basil W. Dellinger, Metairie, La., assignor of fifty percent to L. W. Graham, New Orleans, La.
Filed Feb. 1, 1965, Ser. No. 429,213
6 Claims. (Cl. 35—6)

This invention relates to educational measuring, testing, training, and mental and muscle coordinating machines, such as used in occupational therapy training courses for small children, adults and mentally retarded children, and more particularly, to electrically illuminated alphabetical panels of alphabetical and numerical trainers, and in some instances may even be used as a certain type of illustrative and attractive instructive game which appeals to the imagination of peoples of all ages.

This invention because of its method of operation is very attractive as an operational trainer to children of all levels of intelligence to learn the alphabet and the arabic numerals as commonly thought of and used in the kindergarten levels of education.

This new electrical trainer is especially helpful in providing certain types of individuals with therapeutic coordination of mind and fingers in the use thereof, the best illustration of which is use of the machine by retarded or even individuals with congenital malformation as will be hereinafter explained.

It is well known that there are certain educational devices which electrically display by instruction charts to children the names of objects, such as birds, animals, flowers, birds and other general information to be identified by a child having a previous acquaintance with the subject matter, or to drill and extend the knowledge of a subject. None of these devices are believed to systematically teach or train a child the complete alphabet (ABC's) or numerals as placed in consecutive order from random or other patterns.

This invention overcomes the above difficulties by not only being attractive to induce a child to learn its ABC's and consecutive numerals and what they mean educationally, but correlates the consecutive and random patterns for numerals and alphabetical letters as used in words, numbers in arithmetical exercises for subsequent higher education of the individual subject.

In the operation of one embodiment of the machine of instant invention a switch on the side of same is closed to electrically energize the machine. Then the child subject will look on the vertical board or display chart to see which letter comes first, and then will look down on the tilted switch board and find letter A. The child then actuates the key or throws the toggle switch juxtaposed below the letter A and actuates the circuit to light up the letter A on the chart, then looks to see what the next letter looks like on the display board and then looks down at the keyboard and finds the switch labelled for letter B. If the child chooses a wrong letter it will not light up as the letter sequence is consecutively built into the machine's circuit. Then the child repeats its efforts until the correct switch is actuated to light up the next consecutive letter of the alphabet. The child has no trouble finding where he left off because the last correct letter he has illuminated remains illuminated and the other letters are dark. The child subject repeats this process all the way through the alphabet to the letter Z. When the letter Z lights up on the chart the circuit rings a conclusion bell and the child is delighted to know that a successful game of ABC's has been concluded. Then the keyboard switches may be all thrown to the off position and the alphabetical ABC game may be repeated, as desired.

Other modifications of instant invention may be made in which the letters of the alphabet may be arranged in a combination of random and consecutive configurations on the switch board instead of the random form as shown above for the beginning child subject. This configuration of the keyboard or switch board may be used for the more advanced students of the class or may be used as a measuring, testing, training or coordination means between the mental processes and muscles of handicapped or retarded children. The same application of sequenced and random pattern keyboards may be applied to the use of numbers in schools, and the like.

The primary object of this invention is to provide an attractive educational device for kindergarten children to construct from random arranged alphabetical letters and numbers a pattern of consecutive sequence of normally sequential indicia such as alphabetical letters and consecutive numbers as a pattern or teaching aid for educational use.

Another object of this invention is to provide an electrical educational machine in which the operator will make a successful effort by appeal to the imagination and because of the attractiveness of the machine will cause the educational lesson or subject matter to be as interesting as a game of ABC's or game of numbers, and in which the result will remain indelibly impressed on the operator's mind.

Another object of the invention is to provide an electrical educational machine which is attractive, simple of construction, easy to manipulate and readable directly.

Another object of this invention is to provide a novel circuit and switching arrangement for an educational device energized by a center-top transformer.

A further object of this invention is to provide a novel circuit and switching arrangement for a sequence alphabetical display machine energized by a transformer.

Another object of this invention is to provide a novel circuit including double-pole and relay sequence switching means for actuating the circuit to illuminate consecutive alphabetical letters and numerical symbols which actuates a plurality of indicating means at the termination of the sequence of the illuminated symbols.

A further object of the invention is to provide an electrical educational machine having a random labelled keyboard including hand support means for operating in sequence illuminated letters of the alphabet on a substantially vertical panel.

A still further object of the invention is to provide an electrical illuminated educational machine having a switchboard for operating or illuminating in sequence numerals of a numerical order of numbers.

Another object of the invention is to provide an electrically operated educational machine with means which will provide therapeutic helpful mind and muscle coordination and still appeal to the operator as at attractive illuminated play game without apparent mental effort and mental confusion in the use thereof.

Still other objects of the invention reside in the combination of elements, arrangements of parts, sequence circuitry, configuration, a randomly labelled keyboard or switch board having resting supports for inhibited hands, unique arrangements of parts and features of construction, all as will be more fully pointed out hereinafter and disclosed in the accompanying drawings, wherein there are shown preferred embodiments of this inventive concept.

In the drawings:

FIGURE 1 is a front elevation view in perspective of the manual switch board and selective illuminated alphabetical screen of one embodiment of the invention;

FIGURE 2 is a partial sectional view of one of the manual switches of the keyboard of FIGURE 1;

FIGURE 4 is a schematic circuit diagram showing the electrical circuit of the manual switchboard interconnecting each of the 26 letters of the alphabet;

FIGURE 5 is a diagrammatic circuit connection between an illuminated light of the alphabetical screen of FIGURE 1;

FIGURE 6 is a front perspective view of a second modification of the switchboard of the instant invention;

FIGURE 7 is a sectional view taken through two manual switches of the switchboard of FIGURE 6;

FIGURE 9 is a schematic circuit diagram to illustrate the electrical circuit between the lighted numerals of the numerical screen and the switchboard of FIGURE 8;

Figure 8:
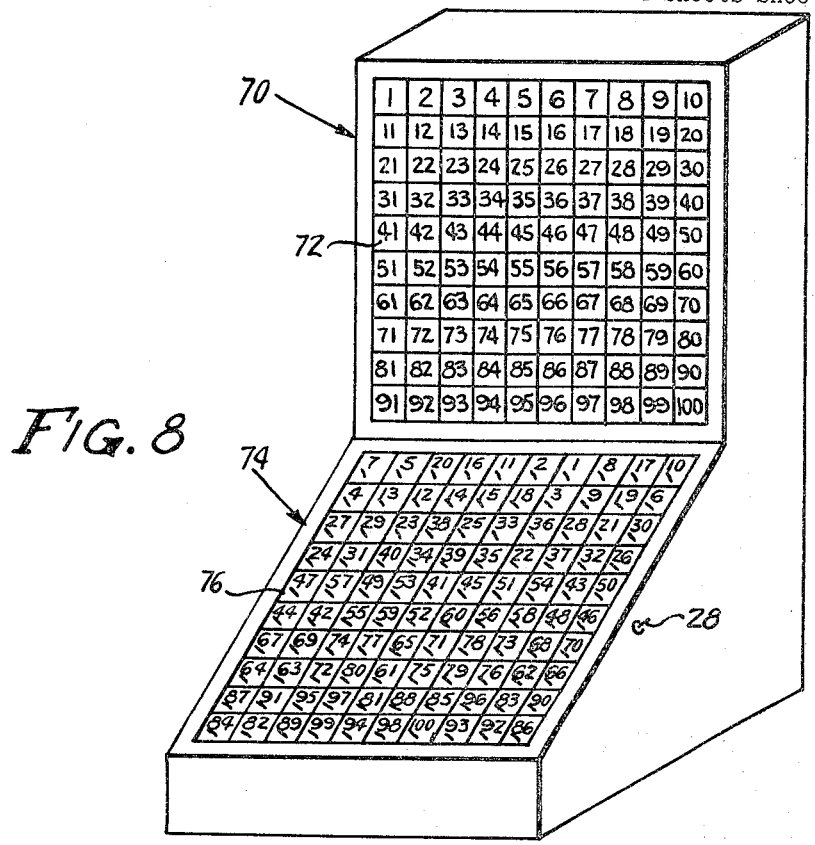
FIGURE 8 is a perspective view of a third modification of the instant invention as adapted for teaching a student consecutive numbers from 1 to 100.

FIGURE 10 is a partial schematic circuit diagram showing a fourth modification of an electrical-circuit and two-way switches of the manual switchboard interconnecting each of the 26 letters of the alphabet by switches directly across a transformer; and FIGURE 10A is a modification of the circuit of FIGURE 10 in which a plurality of relays selectively interconnect a plurality of selectively operated electrical bells or desired indicators to designate the last energized letter sequence of the alphabet or conclusion of the alphabetical game.

Like reference numerals represent like parts in the several views of the drawings.

Referring to FIGURE 1, reference numeral 20 designates the cabinet enclosure of a suitable shape for the new educational ABC machine comprising a substantially vertical panel 22 containing a plurality of rows of alphabetical letters or panels arranged in alphabetical sequence and adapted to be selectively illuminated, an inclined switchboard 24 containing a plurality of alphabetically labelled switch means 26, an on-and-off switch 28, all energized by the electrical circuit of FIGURE 4 having a suitable outlet receptacle plug 30 as will be hereinafter explained. Each letter on the switchboard is collectively arranged in random order thereon and is each juxtaposed to a corresponding switch 26 which when operated in alphabetical sequence with other similar switches illuminate the letters of vertical panel 22 in alphabetical order. If one of the switches 26 is not actuated in proper alphabetical sequence other letters on vertical panel 22 will not be illuminated or displayed until the correct switch 26 in alphabetical sequence for panel 22 is actuated until the end of the alphabet is reached at which time a concluding bell 32 rings to the delight of the child operator which tells the operator the new educational ABC game is over. Switches may then all be thrown to the off position and the game may be repeated again, as desired. The rows of alphabetical letters may be of various attractive colors as desired on illuminated panel 22 and the inclined switchboard 26. Switch means 26 may be of the double-pole-double-throw type or other type, as desired. The circuit of FIGURE 4 is used to energize the illumination panel 22 of FIGURE 1, as hereinafter explained.

FIGURE 2 illustrates one method of mounting switch 26 in a partial section of switchboard 24.

Figure 3:
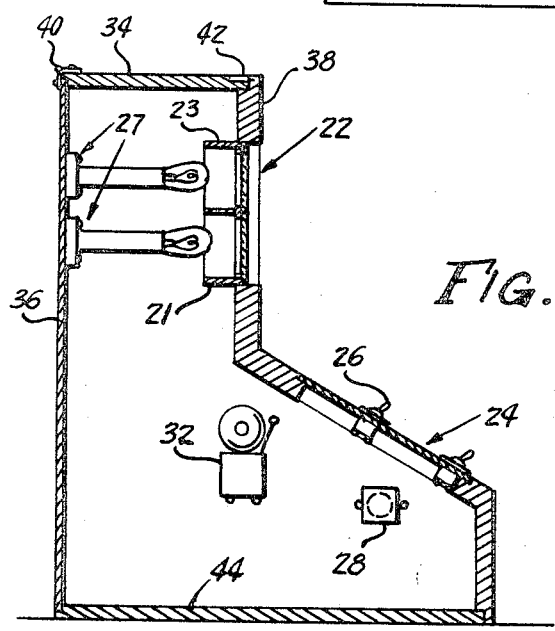
FIGURE 3 is a cross-sectional view taken substantially on lines 3—3 of FIGURE 1.

FIGURE 3 is a cross-sectional view in elevation of enclosure 20 showing the relative positions of illumination panel 22, switchboard 24, switches 26, on-and-off switch 28, bell 32, and individual light means and sockets 27 for each of the alphabetical letters on panel 22 as shown. Enclosure 20 comprises a top 34 which may be hinged to back 36 by hinge 40 and forwardly contact the front 38 of enclosure 20 as desired for easily servicing. Top 34 may be fastened or closed by a suitable lock means 42 if desired to prevent unwarranted individuals from tampering with the internal circuitry of enclosure 20. Enclosure 20 is supported on bottom 44 or any other support means as desired. The illuminated panel 22 may be made of glass, plastic or other suitable material on which the alphabetical letters may be equally spaced and laminated thereon. Each letter has a light fence 23 therearound, the operation of which, is understood by those skilled in the art. The wiring connections between switchboard 24, switch means 28, bell 32 and lights 27 have been omitted for sake of clarity in FIGURE 3, as these connections are clearly shown in the circuitry of FIGURE 4.

FIGURE 6 is similar in circuit and structure to FIGURE 1 except that the switchboard 24 has been replaced with a keyboard 46 in which an alphabetical letter is superimposed upon each of the keys or push button switches in random sequence in attractive colors, as desired. Each of the keys 48 are equally spaced on a suitably inclined keyboard front 50 and each of the keys has a hand support enclosure 52 surrounding it of a suitable strength and height for example one-fourth of an inch, or other height as desired, as best shown in FIGURE 7. Hand support means 52 is particularly helpful to children having inhibited hands needing muscle training and coordination during use of the new machine. For example, the child may have had some malformity in the hands due to an attack of polio, cerebral palsy and the like, in which such aids as 52 are helpful to rehabilitation of the use of the child's hands and use of same with the machine of FIGURE 6. Push button switch 28' (push to make-push to break) of a suitable conventional type is used to turn the machine of FIGURE 6 on and off during use thereof. The circuitry of FIGURE 4 is used to operate FIGURE 6, as hereinafter described.

The circuit of FIGURE 4, in general, comprises an energizing plug 30, on-and-off switch 28 energizing the primary winding 54 of transformer 56 coupled by secondary winding 58 to leads 60 and 62 and ground 64. Each light illuminating means 27 for each alphabetical letter is shown in upper case print is electrically connected by a corresponding labelled switch means 26 for each letter represented by corresponding lower case letters, as shown. Switch means 26 connects light means 27 in parallel arrangement with 62 and 64 for light test purposes, and in parallel sequence with lead 62 and ground 64 for sequence operation of the letters. While the switch means 26 of the alphabetical keyboard are shown in the same alphabetical order as the alphabetical letters, the leads to each of the switches 26 are extended as desired in length so that during assembly, the switches 26 may be placed in random configuration as to alphabetical sequence on switchboard 24, as best shown in FIGURE 1. The circuit of FIGURE 4, serves a dual purpose of testing each light without testing all the lights of the circuit in sequence, and for properly sequencing the illuminating means 27 for each alphabetical letter of panel 22 during the operation of the electrical educational ABC machine of FIGURE 1. For example, the child operator will look on the vertical panel 22 to see which letter comes first, and will then look down on the inclined switchboard 24 and find switch 26 corresponding to letter A and push the toggle switch to position $a'$ which lights or illuminates letter A on panel 22 in the sequence circuit of lead 62 and ground lead 64. If switch 26 is thrown to test position $a$, then the light A will be energized or illuminated for test purposes to see if the light bulb burns, but will not be in the sequence circuit, so as to permit the sequence circuit to operate. Assuming the switch 26 corresponding to letter A has been correctly thrown to position $a'$, then the operator looks at the next letter B on the panel 22, then selects the switch 26 on switchboard 24 corresponding to letter B and throws it to position $b'$ which illuminates the letter B on panel 22. But suppose the operator selects switch 26 for letter C instead of letter B and throws it to the position $c'$ then neither light for letter B or C will be illuminated on panel 22, leaving only letter A illuminated on panel 22, as the sequence circuit only operates in alphabetical sequence, for example, by a lead $aa$ extending to one of the contacts of the switch 26 in position $b'$, as understood by one skilled in the art. The above correct procedure is repeated by the operator until the lights of all alphabetical letters of panel 22 are lighted in alphabetical sequence ending with alphabetical letter Z at which time bell 32 rings to designate the game of educational ABC's is concluded. Then all the switches 26 of switchboard 24 are thrown to center or off position deenergizing all lights 27 of panel 22, after which the game of ABC's may be repeated as desired.

The circuit of FIGURE 4 comprises both a sequence light energizing circuit comprising switches 26, ground lead 64 and leads a—a through z—z connected to lights 27 and bell 32; and a light test circuit comprising lead 60 and ground lead 64 to which each light 27 is connected in parallel by unlabelled leads and switches 26 to leads 60 and 64, as shown.

FIGURE 5 shows a partial circuit of FIGURE 4 for the light 27 of letter B and switch 26 on switchboard 24 for letter b connected to ground lead 64, lead a—a, and lead 60.

The basic circuit of FIGURE 4 as used with FIGURE 6, is energized by a conventional push button on-and-off switch 28', in which labelled keys 48 may be a conventional push button switch of either a conventional single pole-double-throw or a double-pole-double-throw type, as desired. If the single-pole-double-throw type of switch is used the light testing contacts $a,b,c \ldots z$, of FIGURE 4 may still be used as an instrument point test means with each light means 27 of panel 22 which is helpful in locating a burned out light 27, instead of using the sequence circuit therefor. If the two pole-double-throw type of push button switch is used the operation thereof is the same as that for FIGURE 1 for operation of the ABC game, as aforementioned.

FIGURE 7 shows a partial cross-sectional view of keyboard 46 of FIGURE 6 as constructed with raised hand support fence means 52 being equally spaced above and about each side of key 48 of the alphabetical letters positioned in random formation on keyboard 46 similar to the arrangement of switch means 26 on switchboard 24 of FIGURE 1.

For clarity, the internal structure of FIGURE 6 may be considered to be basically the same as that of FIGURE 3, as used in connection with FIGURE 1.

FIGURE 8 comprises a cabinet enclosure 70 including an internal basic structure as shown in FIGURE 3 and having a substantially vertical transparent or translucent display panel 72 electrically illuminated and having a consecutive sequence of arabic numerals from 1 to 100 equally spaced thereon, connected by the circuit of FIGURE 9 to a properly slanted switchboard 74 containing a plurality of switches 76 each designated by an arabic numeral arranged in random configuration. The circuit of the enclosure 70 is energized by an on-and-off switch 28 in a manner similar to FIGURES 1 and 6, as described above. Switch means 76 may be of a conventional double-pole-double-throw switch as described in connection with switch 26 of FIGURE 1, to operate the circuit of FIGURE 9.

For clarity, the circuit of FIGURE 9 shows only the first arabic numbers 1 through 5 and the last arabic numerals from 96 through 100 of the circuit as the numerical sequence for the arabic numerals is built repetitively in the circuit of FIGURE 9, similar to the above sequence of the circuit of FIGURE 4.

The operator of FIGURE 8 goes through the same sequence of steps of operation with the numeral notation as described for the alphabetical sequence of FIGURES 1 and 6, until bell 32 rings which designates the end of the sequence of numeral 1 through 100 or conclusion of the numerical game.

The circuit of FIGURE 9 comprises a sequence light energizing circuit which comprising switches 76, ground lead 64 and leads 1—1 through 5—5 and 95—95 through 100—100 connected to lights 27 and bell 32; and a test light circuit comprising lead 60 and ground lead 64 to which each light 27 is connected in parallel by unlabelled leads and switches 76 to leads 60 and 64, as shown in FIGURE 9. While each labelled switch 76 is shown in numerical order in FIGURE 9, the leads to each of these switches may be extended in length to arrange the switches in a labelled random configuration as shown on switchboard 74, of FIGURE 8, as understood by those skilled in the art.

While the circuits of FIGURES 4 and 9 are shown as electrically energized by plug 30 and transformer means 56, it is to be understood, that these circuits may be energized by a conventional battery or other suitable electrical means, as desired, within the purview of this invention.

The instant invention has been used in a school for retarded children. This machine has helped these children tremendously in a very short time. For example, four or five years has been spent trying to teach these children their ABC's and now by using these machines they are able to learn and know the complete alphabet in two or three weeks. Also for example, one boy who is 12 years of age and who is retarded by having had cerebral palsy and is deaf and dumb learned the alphabet in four weeks. Another child who is a Mongoloid was found to learn the alphabet in 6 weeks. The children who have hearing are very delighted to hear bell 32 ring. For children who have no hearing, a light or other suitable game conclusion means may be substituted for bell 32, within the purview of this invention.

By raising the imprint of letters on the switchboard or keyboard of FIGURES 1 and 6, the teacher may quickly test a blind child whether it has learned the alphabet, and the same thing applies to the sequence of arabic numerals of FIGURE 8.

It is to be understood, that the letters or numerals on the display panel and switchboard or keyboard of each modification of this invention may be of any suitable material and arranged in any attractive design of colors as display panels or manual keyboards and the like within the purview of this invention.

The circuit of FIGURE 10 comprises a cabinet enclosure similar to that shown in FIGURE 3, having a plug 110 connected to an energized outlet receptacle (not shown) by leads 112, 114 and switch 116 to the primary winding 118 of transformer 120 which is connected by secondary winding 122 to leads 124 and 126, connected to the keyboard circuit generally indicated by reference numeral 123.

For clarity, the new sequence keyboard circuit 123 of FIGURE 10 shows only the illuminating means, circuit and switch means for the letters A, B, and C of the beginning of the alphabet and letters Y and Z of the end of the alphabet, as the circuit is a step repeating sequence circuit configuration for each letter of the alphabet.

The keyboard circuit 123 of FIGURE 10 includes a sequence light energizing circuit comprising lead 124 connected in parallel with lights 27a, 27b, 27c, 27y and 27z to their respective switches $a, b, c, y$ and $z$ and bell means 32, as shown. Lead 126 is connected by contacts 128a and 128b of switch means 128 to either leads 130 or 132 to the open contacts $a^1$ or $a^2$ of switch $a$. Lead 134 connects switch $a$ to contact $b'$ of switch $b$, and lead 136 connects the other side of switch $a$ to contact $b^2$ of switch $b$. Lead 138 connects switch $b$ to contact $c^1$, and lead 140 progressively connects the other side of switch $b$ to contact $c^2$ of switch $c$, and leads 141 and 142 similarly connects to opposite contacts of switch $d$ (not shown) etc. Lead 160 from the left side of switch $x$ (not shown) is progressively connected in sequence to contact $y^1$ of switch $y$ and lead or conductor 162 is likewise connected to contact $y^2$ of switch $y$. Lead 164 connects switch $y$ to contact $z^1$ of switch $z$, and lead 166 connects switch $y$ to contact $z^2$ of switch $z$. Leads 168 and 170 connected separately to each side of switch $z$ are connected in parallel to the other side of the winding of bell means 32 which is also connected to conductor 124, as above mentioned. The circuit of FIGURE 10 is unique in circuit arrangement and switching means because, an inhibited child who has paralysis in certain hand and arm muscles may either push or pull a double-pole-double throw switch for each letter in sequence of operation of the new ABC machine, allowing operation of certain usable muscles and rehabilitating certain other paralyzed muscles of the patient, as understood by those skilled in the medical profession.

In operation, the circuit of FIGURE 10 is energized by closing switch 116 after which switch 128 may be selectively thrown to a closed position on either contact 128a or 128b to permit either a pushing or pulling backward of the letter switches a through z by the patient operator during operation of the game of the novel ABC machine. The letter switches a through z may be arranged in alphabetical sequence on keyboard panel 24 of FIGURE 3 or in random formation on panel keyboard 24 by extending the various leads to switches a through z, as understood by those skilled in the art.

In operation of FIGURE 10 the new ABC machine is energized as already described by switches 116 and 128, after which the patient operator selects the proper one of the marked a through z switches until all letters or lights (27a–27z) of the alphabet are progressively energized in sequence beginning with letter A and continuing through letter Z, after which bell 32 rings. Should the operator energize one letter out of sequence the remainder of the letters of the alphabetic machine will not be energized or illuminated until the operator actuates the switch for the next following letter in sequence, as understood by those skilled in the art.

FIGURE 10A is identical to the Y and Z portion of the circuit of FIGURE 10 in circuitry and operation, except bell 32 is connected by leads 170, 171 and relay means R–1 to one side of switch Z, and bell 32a is connected by lead 169, relay R–2 and lead 168 to the other side of switch means z. The energizing source, control means (switches) and windings of relays R–1 and R–2 are conventional and are omitted for clarity. Relay R–1 selectively connects lead 171 by armature 174 to lead 170, and lead 169 is selectively connected by armature 176 of relay R–2 to lead 168. Separate switches controlling each relay may be stationed remotely on an instructor's desk so that the instructor may selectively deenergize either or both of bells 32 and 32a until the student has successfully completed the ABC game on the machine a designated number of times before the rewarding bells 32 and 32a, depending on which contact of the switches 128, and a–z are used, are either allowed to ring to conclude a prescribed number of games or other type of operation of the new ABC machine. The windings of relays R–1 and R–2 may be selectively energized, either by battery or an energized low voltage transformer means to selectively operate armature 174 of relay R–1 or armature 176 of relay F–2, as desired, and understood by those skilled in the art.

From the foregoing it will now be seen that there is herein provided an improved electrical educational machine which accomplishes all the objects of this invention and others, including many advantages of great practical utility and commercial importance.

It is to be understood, of course, that the foregoing disclosure relates to only various preferred embodiments of the invention and that it is intended to cover all changes and modifications of the invention herein chosen for the purposes of the disclosure, which do not constitute departures from the spirit and scope of the invention set forth in the appended claims.

What is claimed is:
1. An electrical education apparatus permitting visual comparison of indicia arranged in proper sequence with corresponding indicia randomly arranged for teaching the user to compare the two sets of indicia and to make the proper selection from the randomly arranged indicia, comprising:
   an enclosure having openings therein;
   properly arranged light transmitting sequential indicia mounted in openings in the enclosure;
   a plurality of lamps mounted in the enclosure for individually lighting the indicia;
   a plurality of switches mounted in enclosure openings;
   indicia corresponding to the sequential indicia marking the switches, said switches and associated indicia being randomly arranged;
   a circuit interconnecting the first of the sequential indicia lamps and its corresponding switch to energize the first lamp when the first switch is closed and to apply power to the switch corresponding to the second indicia; and
   a plurality of circuits individually interconnecting the second and subsequent sequential indicia lamps with the respective switches for energizing the lamp individually and applying power to the switch corresponding to the next sequential indicia lamp for permitting the second and subsequent sequential indicia lamps to be energized only when the next previous sequential indicia lamp has been energized.

2. The invention of claim 1 wherein the indicia are numbers.

3. The invention of claim 1 wherein the indicia are alphabetical letters.

4. The invention of claim 1 further including:
   an audible signal device mounted inside the enclosure; and
   circuit means interconnecting the last of the sequential indicia lamps and the signal device for energizing the signal device when the last sequential indicia lamp is energized.

5. The invention of claim 1 wherein the switches are keys and further including raised side enclosures surrounding each of the keys for supporting malformed hands of an operator during operation of the keys.

6. The invention of claim 4 wherein the switches are keys and further including raised side enclosures surrounding each of the keys for supporting malformed hands of an operator during operation of the keys.

References Cited

UNITED STATES PATENTS

| | | | |
|---|---|---|---|
| 958,781 | 5/1910 | Spencer | 35—9 |
| 1,617,272 | 2/1927 | Peterson | 35—31.3 |
| 3,015,895 | 1/1962 | Stall | 35—9 |

EUGENE R. CAPOZIO, *Primary Examiner.*

R. E. KLEIN, W. NIELSEN, *Assistant Examiners.*